Patented July 4, 1944

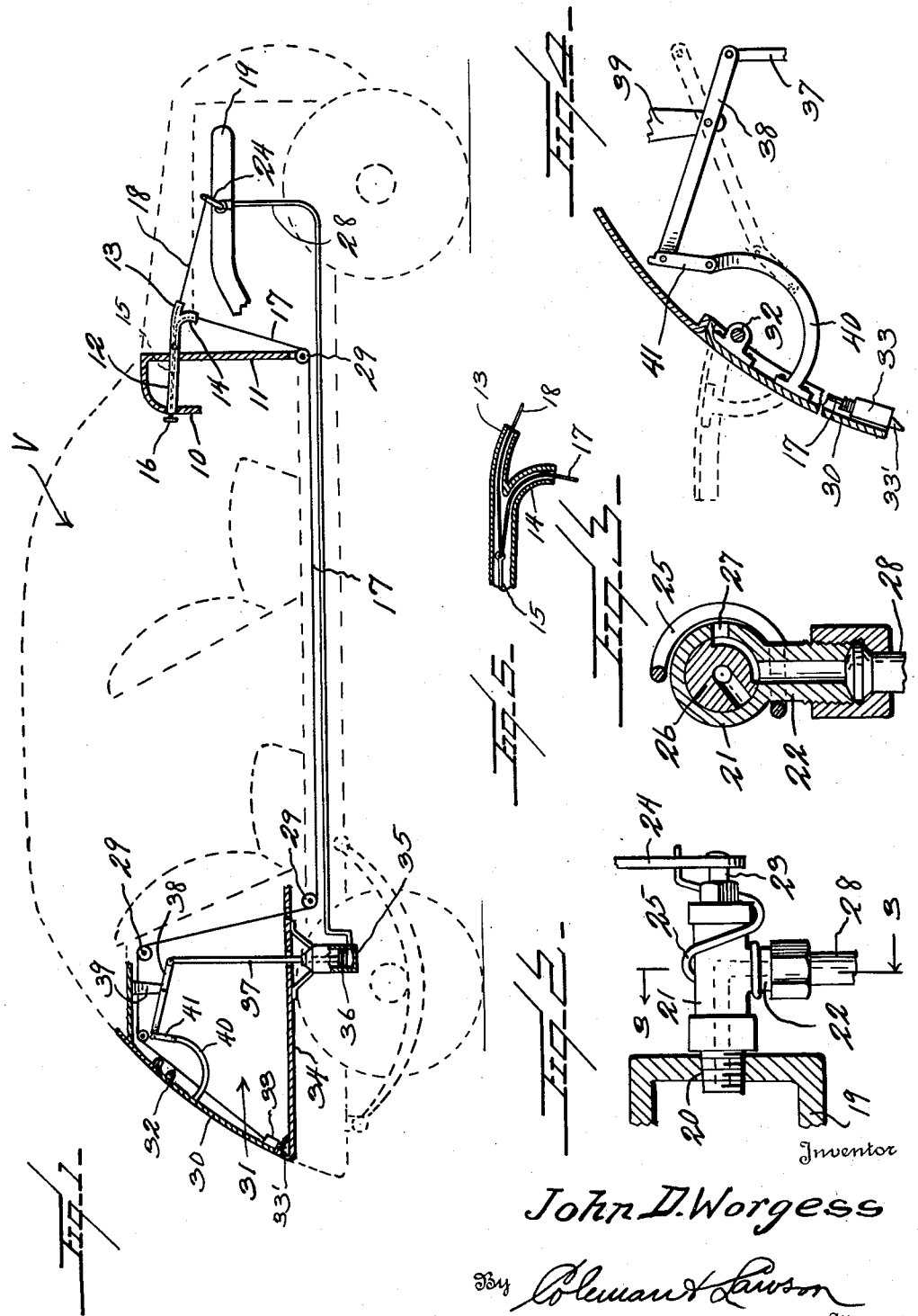

2,352,929

UNITED STATES PATENT OFFICE 2,352,929

VEHICLE LUGGAGE COMPARTMENT DOOR OPERATOR

John D. Worgess, Jacksonville, Fla.

Application May 26, 1942, Serial No. 444,567

4 Claims. (Cl. 180—1)

This invention relates generally to the class of vehicles and pertains particularly to improvements in actuators for the doors of rear truck compartments of motor vehicles.

In motor vehicles of the sedan type there is customarily provided a trunk or luggage compartment in the rear behind the rear seat, which is provided with a cover or door which swings upwardly when being opened. Ordinarily it is a matter of slight inconvenience for the operator of a vehicle or a passenger to leave the vehicle and go to the rear to open the compartment door when it is required that access be had to the interior of the compartment but, at the present time, when many vehicle drivers have their places of employment in restricted areas or guarded areas it is very inconvenient and time consuming for the operator of the vehicle to leave the same and go to the rear to open the compartment when entering and leaving such areas, to allow the compartment to be inspected by guards, and when it is considered that many thousands of such vehicles enter and leave such areas every day, it will be appreciated that much time is consumed in this procedure and difficulty is encountered in keeping the vehicular traffic moving rapidly.

In view of the foregoing it is an object of the present invention to provide a novel means whereby the occupant of a motor vehicle which is equipped with a rear luggage carrier, may easily and quickly effect the opening and closing of the door or cover for such compartment without leaving the vehicle and, consequently, when the vehicle is one among many others which have to stop at an inspection station when leaving or entering a restricted or guarded area, the saving in time resulting from the employment of the present mechanism makes it possible to keep vehicles equipped with the same moving more rapidly past such a station.

Another object of the invention is to provide a vehicle luggage compartment door actuating means which is controlled from the motor vehicle engine by the employment of the pressure of the products of combustion discharged from the vehicle engine cylinders into the exhaust manifold.

Another object of the invention is to provide in a mechanism of the above described character, a novel construction wherein the luggage compartment door will be unlocked or released simultaneously with the throwing into operation of the pressure apparatus which forces the door to swing to open position.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a diagrammatic view illustrating the application of the present invention to a motor vehicle, parts of the diagrammed structure being in section;

Figure 2 is a detailed view of the pet-cock coupling the exhaust manifold with the piston cylinder pipe;

Figure 3 is a sectional view on the line 3—3 of Figure 2;

Figure 4 is a detailed section on an enlarged scale of the trunk compartment door actuating linkage;

Figure 5 is a detailed sectional view on an enlarged scale of the forward end of the cable tube.

Referring now more particularly to the drawing, there is illustrated by dotted or broken lines the outline of a motor vehicle indicated generally by the character V, wherein such portions of the structure as are necessary for a proper description and illustration of the application of the present invention, are shown in full lines.

In accordance with the present invention there is connected between the instrument panel 10 of the vehicle and the dashboard 11, a flexible tube or conduit 12 which, at the forward end, beneath the hood of the vehicle, is divided to provide the two branches 13 and 14.

Extending through the conduit 12 is a flexible pull wire 15 upon the forward end of which is secured a pull button 16 which is located in front of the panel 10 where it may be easily grasped by the vehicle operator or an occupant of the front seat of the vehicle. The forward end of the cable or wire 15 has joined thereto an end of each of two pull wires 17 and 18, the wire 17 passing through the branch 14 of the conduit, while the wire 18 passes through the branch 13, as illustrated.

The numeral 19 designates the exhaust manifold for the vehicle engine. This is provided with a suitable tapped opening 20 in which is threadably secured a pet cock 21 having the branch arm 22 and the operating stem 23 which is under the control of the lever or handle 24. To this lever or handle 24 the other end of the wire 18 is connected. A spring 25 is secured to the pet cock and connected with the lever 24 and normally urges the turning of the lever and the stem 23 to a position where the rotary plug 26 of the cock establishes communication between the branch 22 and an exhaust opening 27 which is formed through the side of the housing of the cock. When the lever or handle 24 is pulled rearwardly, as by the application of a rearward pull to the wire 18, the plug 26 will be turned to a position to establish communication between the branch 22 of the cock and the interior of the exhaust manifold 19. The pet cock will then be in the turned-on position, whereby the flow of exhaust gases under pressure may pass from the exhaust manifold through the outlet branch 22 of the cock into the pipe line 28 which is connected at one end with the outlet of the cock.

The pull cable or wire 17 is run or extended to the rear of the vehicle, being passed over suitable pulleys 29 so that it may be worked with maximum ease or smoothness, and this wire passes along the inner side of the door or cover 30 of the luggage or trunk compartment 31 of the vehicle. This door 30 is hingedly mounted in the customary manner, at its top edge, as indicated at 32, so as to swing upwardly upon a horizontal pivot or axis. The lock or latch for the door 30 is indicated generally by the numeral 33, and the bolt 33' thereof has a suitable hole drilled therein to receive the end of the actuating wire 17 which is secured to the bolt or a screw, or in any other suitable means, so that when a pull is applied to the button 16 the bolt will be retracted through the actuation of the wire 17.

Supported in a suitable manner beneath the floor 34 of the luggage compartment 31 is a piston cylinder 35 with the lower end of which the pipe 28 communicates. Within this cylinder is a piston 36 having a stem 37 which extends upwardly, in the rear portion of the compartment, and is pivotally connected at its upper end with a rock arm 38 which, in turn, is pivotally mounted intermediate its ends upon a suitable bracket 39 secured in the top of the compartment.

Secured to the inner side of the door 30, near the top or pivoted edge thereof, is a rigid arm 40 which extends inwardly and upwardly and is pivotally coupled at its inner end with the adjacent end of the rock arm 38, by the link 41.

In the operation of the present mechanism, the operator of the vehicle or an occupant of the front seat pulls back upon the button 16, thus pulling the wires 17 and 18. The wire 18 will actuate the pet cock 21 to allow the gases under pressure to issue from the exhaust manifold 19 and pass rearwardly through the pipe 28 to the piston cylinder 35, and the wire 17 when pulled will retract the lock bolt 34 so as to unlock the compartment door. The gases entering the cylinder 35 will force the piston 36 and piston rod 37 upwardly to rock the bar 38 so as to exert a downward thrust upon the arm 40, thereby causing the door to swing outwardly and upwardly to opened position.

When the wire 18 is pulled to oscillate the lever 24, the spring 25 will be tensioned and, consequently, when the button 16 is released and pushed in the spring will reversely turn the stem 23 so as to restore the plug 26 to exhaust position, wherein the pipe line 28 will be put into communication with the exhaust opening 27, thus allowing the gases to be forced back through the pipe and to the atmosphere, this being accomplished by the weight of the door actuating the piston 36 through the medium of the bar 38 and other mechanism connecting the piston rod with the door. Thus, it will be readily seen that the vehicle operator can effect the opening and closing of the luggage compartment door or cover without having to leave his seat.

The mechanism will be so arranged and adjusted that the door will be opened a sufficient distance to enable an inspector or guard to look into the luggage compartment, but not far enough to cause the catches for the door to set in a position to lock or secure the door open.

I claim:

1. In a motor vehicle having a luggage compartment provided with an upwardly swinging door, and an engine, means for effecting the opening of said door from the front part of the vehicle, comprising an arm connected with the inner side of the door, an oscillatably mounted thrust bar operatively coupled with said arm, a power piston operatively coupled with said bar to effect oscillation of the same, a connection between the power piston and said engine for effecting the transmission of exhaust gases under pressure to the under side of said piston and the actuation of the latter for the opening of the door, a valve interposed in the line for controlling the flow therethrough, automatic means for moving the valve and maintaining the same in a position to close flow through the connection to the power piston, and manual means for moving the valve in position to open the connection between the power piston and engine.

2. In a motor vehicle having a luggage compartment provided with a pivoted door and an engine having an exhaust manifold, means for effecting the opening of said door comprising a thrust arm secured to the door upon the inner side thereof, a piston cylinder and a piston within the cylinder, said piston having a rod connected therewith, said piston rod extending into the compartment, a linkage connection between said piston rod and said arm whereby movement of the piston and piston rod in one direction will effect the oscillation of the door to opened position, a vent cock operatively coupled with said manifold to take off gases under pressure therefrom, a pipe line connected between said vent cock and said piston cylinder, automatic means for normally closing the flow through the pipe line to the cylinder, and manual means operatively connected with the vent cock to facilitate opening the latter from the front part of the vehicle for the transmission of gases under pressure to the cylinder and the actuation of said piston in the said one direction.

3. In a motor vehicle having a luggage compartment provided with an upwardly swinging door and an engine, means for effecting the opening of said door from the front part of the vehicle, comprising an arm connected with the inner side of the door, an oscillatably mounted thrust bar operatively coupled with said arm, a power piston operatively coupled with said bar to effect oscillation of the same, a connection between the power piston and said engine for effecting the transmission of exhaust gases under pressure to the under side of said piston and the actuation of the latter for the opening of the door, a valve interposed in the line for controlling the flow therethrough, automatic means for moving the valve and maintaining the same in a position to close flow through the connection to the power piston, and manual means for moving the valve in position to open the connection between the power piston and engine, said connection having an exhaust opening, the valve closing said exhaust opening when the valve is in its first named position and opening the exhaust opening when the valve is in its second position.

4. In a motor vehicle having a luggage compartment including a top wall, a bottom wall and a pivoted door, a rock arm within the compartment and pivotally supported by the top wall, a thrust arm carried by the door and extending inwardly of the compartment, a link operatively connecting the thrust arm with the rock arm, a cylinder below and suspended from the bottom wall of the compartment, a piston working therein, a piston rod associated with the piston and extending upwardly into the compartment through the bottom wall, said rod being operatively connected with the rock arm whereby movement of the piston in one direction will effect opening movement of the door, an engine carried by the vehicle having an exhaust manifold, and a connection between the manifold and the cylinder for transmission of exhaust gases under pressure to move the piston in a direction to open the door.

JOHN D. WORGESS.